US005509680A

United States Patent [19]

Scharf et al.

[11] Patent Number: 5,509,680

[45] Date of Patent: Apr. 23, 1996

[54] WHEELCHAIR TETHER

[76] Inventors: Albert Scharf, 9 Grace St., Danbury, Conn. 06811; Diane A. Pimentel, 43 Vail Rd., Bethel, Conn. 06801

[21] Appl. No.: 329,533

[22] Filed: Oct. 26, 1994

[51] Int. Cl.[6] .......... F16C 11/00

[52] U.S. Cl. .......... 280/304.1; 248/282.1

[58] Field of Search .......... 280/304.1, 250.1; 248/276

[56] References Cited

U.S. PATENT DOCUMENTS

| | | | |
|---|---|---|---|
| 4,170,336 | 10/1979 | Malis | 248/276 |
| 4,402,481 | 9/1983 | Sasaki | 248/276 |
| 4,572,536 | 2/1986 | Doughty | 280/304.1 |
| 5,236,213 | 8/1993 | Trickett | 280/304.1 |
| 5,379,205 | 1/1995 | Peng | 248/276 |

*Primary Examiner*—Mitchell J. Hill

[57] ABSTRACT

A tether for towing a medical support structure relative to a wheelchair. The inventive device includes a wheelchair mounting bracket securable to an associated wheelchair. A support mounting assembly is pivotally coupled to the wheelchair mounting bracket and extends therefrom for coupling to a medical support structure, such as an IV pole or the like. The device permits an individual to tow the medical support structure behind the wheelchair without necessitating a manual grasping of the support structure during movement of the wheelchair.

7 Claims, 3 Drawing Sheets

Fig.5
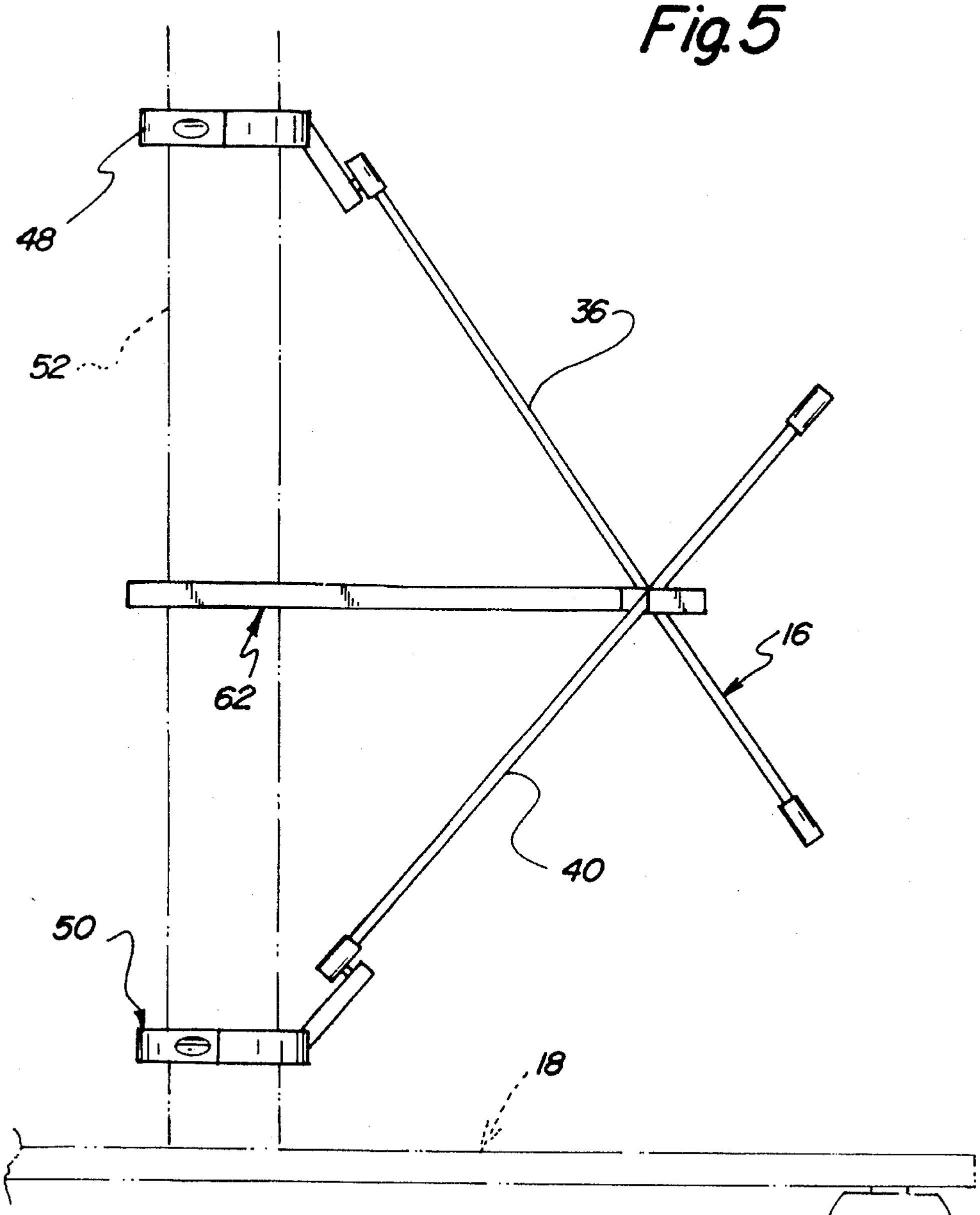
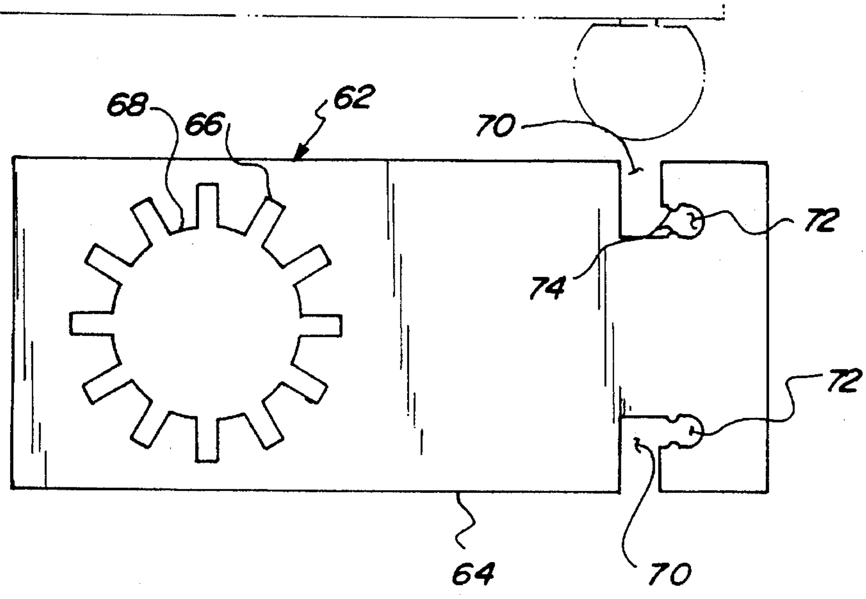
Fig.6

WHEELCHAIR TETHER

BACKGROUND OF THE INVENTION

Field of the Invention

The present invention relates to towing devices and more particularly pertains to a tether for towing a medical support structure relative to a wheelchair.

Description of the Prior Art

The use of towing devices is known in the prior art. More specifically, towing devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art towing devices include U.S. Pat. No. 5,009,442; U.S. Pat. No. 4,861,059; U.S. Pat. No. 4,815,688; U.S. Pat. No. 4,515,385; and U.S. Pat. No. 3,515,429.

While these devices fulfill their respective, particular objectives and requirements, the aforementioned patents do not disclose a tether for towing a medical support structure relative to a wheelchair which includes a wheelchair mounting bracket securable to an associated wheelchair, and a support mounting assembly pivotally coupled to the wheelchair mounting bracket and extending therefrom for coupling to a medical support structure to permit an individual to tow the medical support structure behind the wheelchair.

In these respects, the wheelchair tether according to the present invention substantially departs from the conventional concepts and designs of the prior art, and in so doing provides an apparatus primarily developed for the purpose of towing a medical support structure relative to a wheelchair.

SUMMARY OF THE INVENTION

In view of the foregoing disadvantages inherent in the known types of towing devices now present in the prior art, the present invention provides a new wheelchair tether construction wherein the same can be utilized for towing a medical support structure relative to a wheelchair. As such, the general purpose of the present invention, which will be described subsequently in greater detail, is to provide a new wheelchair tether apparatus and method which has many of the advantages of the towing devices mentioned heretofore and many novel features that result in a wheelchair tether which is not anticipated, rendered obvious, suggested, or even implied by any of the prior art towing devices, either alone or in any combination thereof.

To attain this, the present invention generally comprises a tether for towing a medical support structure relative to a wheelchair. The inventive device includes a wheelchair mounting bracket securable to an associated wheelchair. A support mounting assembly is pivotally coupled to the wheelchair mounting bracket and extends therefrom for coupling to a medical support structure, such as an IV pole or the like. The device permits an individual to tow the medical support structure behind the wheelchair without necessitating a manual grasping of the support structure during movement of the wheelchair.

There has thus been outlined, rather broadly, the more important features of the invention in order that the detailed description thereof that follows may be better understood, and fin order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new wheelchair tether apparatus and method which has many of the advantages of the towing devices mentioned heretofore and many novel features that result in a wheelchair tether which is not anticipated, rendered obvious, suggested, or even implied by any of the prior art towing devices, either alone or in any combination thereof.

It is another object of the present invention to provide a new wheelchair tether which may be easily and efficiently manufactured and marketed.

It is a further object of the present invention to provide a new wheelchair tether which is of a durable and reliable construction.

An even further object of the present invention is to provide a new wheelchair tether which is susceptible of a low cost of manufacture with regard to both materials and labor, and which accordingly is then susceptible of low prices of sale to the consuming public, thereby making such wheelchair tethers economically available to the buying public.

Still yet another object of the present invention is to provide a new wheelchair tether which provides in the apparatuses and methods of the prior art some of the advantages thereof, while simultaneously overcoming some of the disadvantages normally associated therewith.

Still another object of the present invention is to provide a new wheelchair tether for towing a medical support structure relative to a wheelchair.

Yet another object of the present invention is to provide a new wheelchair tether which includes a wheelchair mounting bracket securable to an associated wheelchair, and a support mounting assembly pivotally coupled to the wheelchair mounting bracket and extending therefrom for coupling to a medical support structure to permit an individual to tow the medical support structure behind the wheelchair.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a side elevation view of a portion of the present invention including a storing tab.

FIG. 6 is a top plan view of the storing tab.

DESCRIPTION OF THE PREFERRED EMBODIMENT

Figure 1:
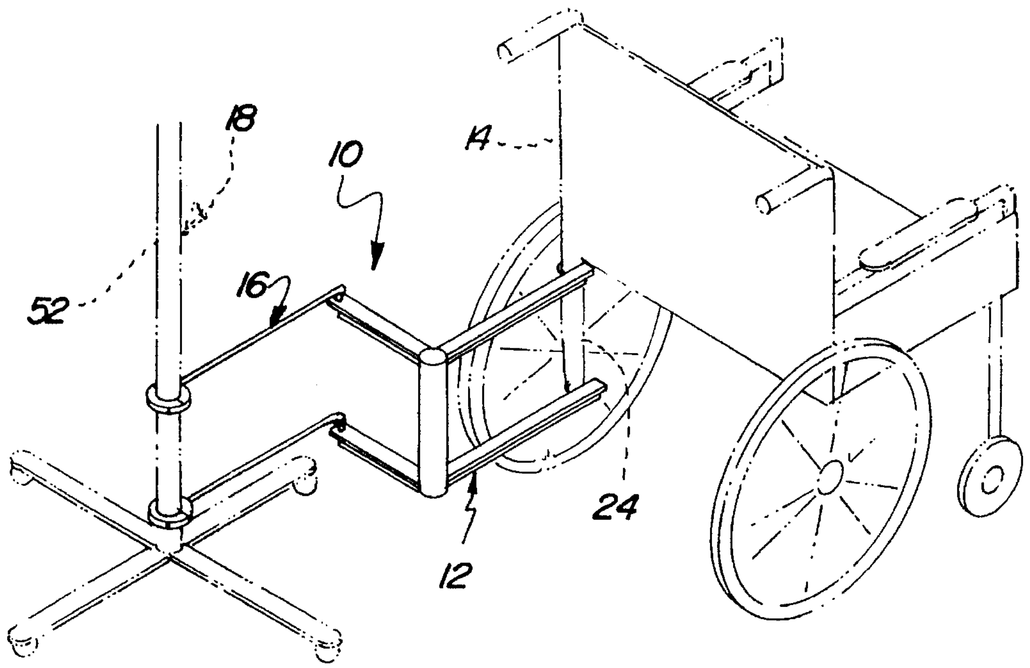
FIG. 1 is an isometric illustration of a wheelchair tether according to the present invention as installed between a wheelchair and a medical support structure.

With reference now to the drawings, and in particular to FIGS. 1–6 thereof, a new wheelchair tether embodying the principles and concepts of the present invention and generally designated by the reference numeral 10 will be described.

More specifically, it will be noted that the wheelchair tether 10 comprises a mounting means 12 for securing to a wheelchair 14, and a support mounting means 16 pivotally coupled to the mounting means 12 for towing a medical support structure 18 relative to the wheelchair 14, as best illustrated in FIG. 1 of the drawings.

Figure 2:
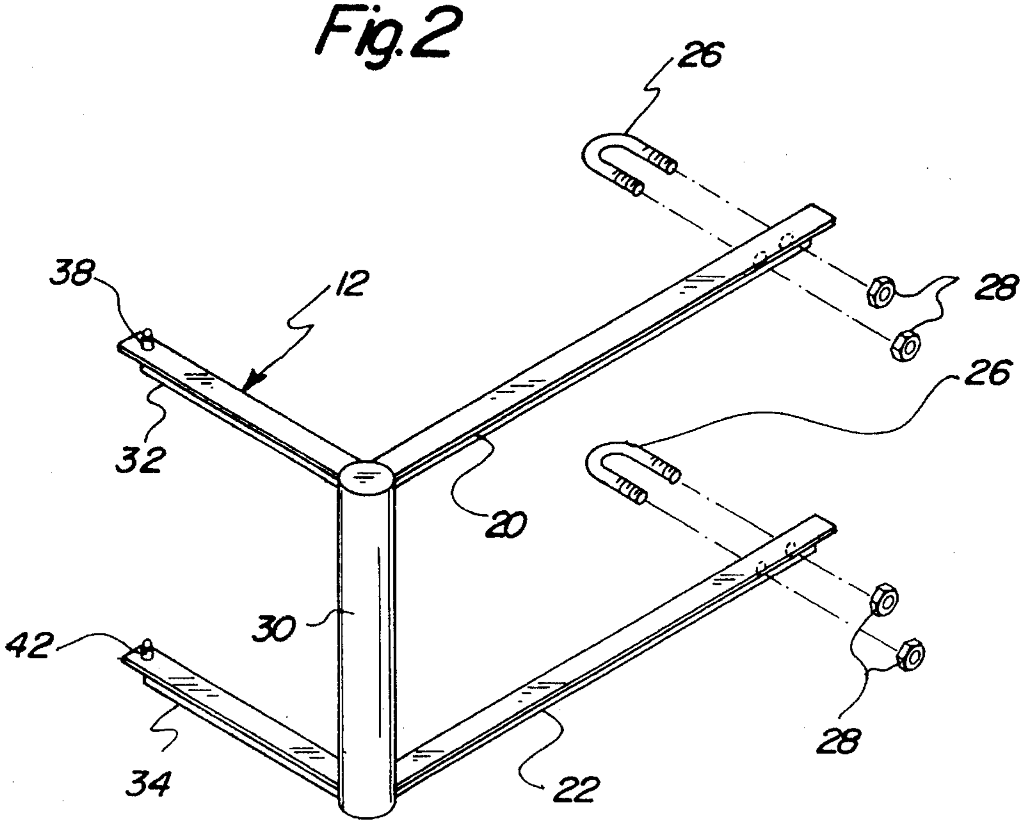
FIG. 2 is an isometric illustration of a wheelchair mounting means comprising a portion of the present invention.

Referring now to FIG. 2, it can be shown that the wheelchair mounting means 12 according to the present invention 10 preferably comprises an upper rear extension member 20 and a lower rear extension member 22 which can be coupled to a wheel supporting leg 24 of the associated wheelchair 14. To this end, both the upper and lower rear extension members 20 and 22 include a pair of unlabeled spaced mounting apertures permitting the passage of a pair of U-bolts 26 therethrough. The U-bolt can thus be positioned about the wheel supporting leg 24 of the wheelchair 14, positioned through the mounting apertures, and subsequently secured by a threaded engagement of a plurality of securing nuts 28 thereto. By this mounting, the rear extension members 20 and 22 project rearwardly of the wheelchair 14 to a point behind the rear wheels thereof. The rear extension members 20 and 22 are oriented in a spaced and parallel relationship and each terminates in a distal end whereat a center support member 30 extend therebetween to support the rear extension members in the spaced relationship absent from the wheelchair 14 and to further rigidify the wheelchair mounting means 12.

With continuing reference to FIG. 2, the mounting means 12 further comprises an upper lateral extension member 32 and a lower lateral extension member 34. The lateral extension members 32 and 34 are fixedly secured to the center support member and project substantially orthogonally therefrom relative to the rear extension members 20 and 22. The lateral extension members 32 and 34 are configured to project laterally of the wheel supporting leg of the wheelchair 14 to a point substantially behind a rear wheel thereof. Preferably, the lateral extension members 32 and 34 terminate within a plane containing the rear wheel of the wheelchair 14 so as to not project :beyond the wheelchair. Such configuration of the lateral extension members 32 and 34 of the wheelchair mounting means 12 precludes unintentional engagement of the mounting means with surrounding stationary objects during movement of the wheelchair 14 and device 10.

Figure 3:
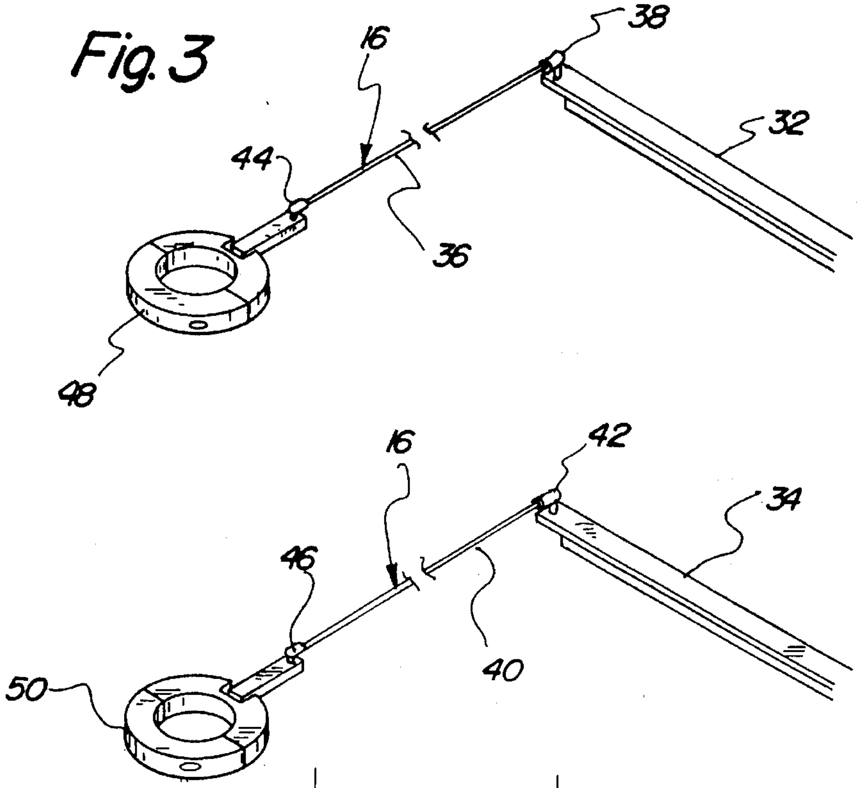
FIG. 3 is an isometric illustration of a support mounting means comprising a further portion of the present invention.

Referring now to FIG. 3, the support mounting means 16 is pivotally mounted to distal ends of the lateral extension members 32 and 34. To this end, the support mounting means 16 preferably comprises an upper towing rod 36 pivotally coupled to the distal end of the upper lateral extension member 32 by an upper extension member ball joint 38. Similarly, a lower towing rod 40 is pivotally coupled to the distal end of the: lower lateral extension member 34 by a lower extension member ball joint 42. The towing rods 36 and 40 of the support mounting means 16 extend from the respective lateral extension members 32 and 34 and are coupled to upper and lower post couplers 44 and 46 by an upper post coupler 48 and a lower post coupler 50, respectively. The post couplers 48 and 50 are thusly securable about the post 52 of a medical support structure 18 such as the IV pole illustrated in FIGS. 1 and 4, for example.

Figure 4:
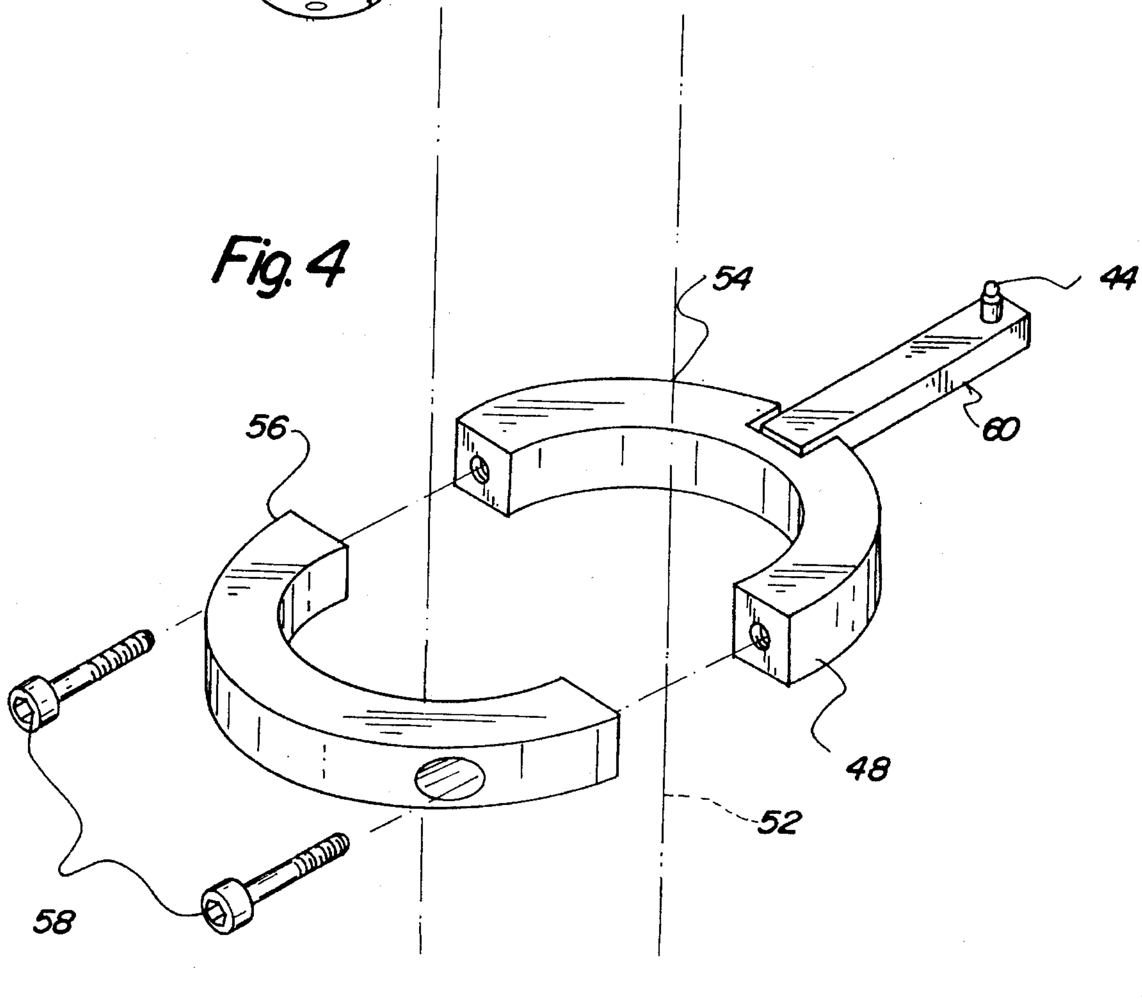
FIG. 4 is an exploded isometric illustration of a post coupler of the present invention.

Each of the post couplers is substantially similar in design and configuration, and therefore, only one will be described in detail. As shown in FIG. 4 for the upper post coupler 48, each of the post couplers 48 and 50 comprises a first semi-cylindrical member 54 positionable partially about the post 52 of the medical support structure 18. A second semi-cylindrical member 56 is removably coupled to the first semi-cylindrical member 54 by at least one threaded fastener 58 projecting through unlabeled apertures in the second semi-cylindrical member which threadably engage the first semi-cylindrical member 54 to secure and frictionally engage the post coupler 48 about the post 52. To couple the towing rods 36 and 40 to the respective first semi-cylindrical members 54 of the respective post coupler 48 and 50, a pivot arm 60 is pivotally mounted within a rectangular aperture extending into the first semi-cylindrical member by an unlabeled pivot pin. The pivot arm extends from the first semi-cylindrical member 54 and is secured to the respective post coupler ball joint 44 or 46. Thus, the towing rods 36 and 40 are movable coupled to the respective post couplers 48 and 50 by both the movable mounting of the post coupler ball joints 44 and 46 and the pivotal mounting of the pivot arms 60 forming a portion of each of the post couplers. By this structure, the medical support structure 18 can be towed directly behind one of the rear wheels of the wheelchair 14 during straight forward movement thereof, yet still maintain an ability to pivot relative to the wheel chair during turns and the like. Further; the ball joint connections 38, 42, 48, and 50 utilized herein allow the wheelchair to be raised and lowered relative to the medical support structure 18. In other words, should the wheelchair be lifted over a curb or begin to climb a ramp, the support mounting means 16 will permit such relative vertical movement to preclude a tipping of the medical support structure.

When the support mounting means 16 of the present invention 10 is not coupled to the wheelchair mounting means 12, it is desirable to retain the towing rods 36 and 40 relative to the medical support structure as shown in FIG. 5. To this end, the present invention can additionally include a storing tab 62 mountable to the post 52 of the medical support structure 18 which can removably retain the towing rods 36 and 40 relative thereto. As shown in FIG. 6, the storing tab 62 preferably comprises a substantially planar member 64 having a circular aperture 66 extending therethrough for receiving the post 52 of the support structure 18 therethrough. A plurality of radial projections 68 extend radially inward from an interior of the aperture 66 and serve to resiliently engage an exterior surface of the post 18 to frictionally secure a vertical position of the storing tab relative to the post while permitting selective movement thereof, as desired. The planar member 64, when installed to the post 52 as shown in FIG. 5, projects therefrom to a position between the post couplers 48 and 50 to engage the towing rods 36 and 40. To this end, the planar member is shaped so as to define unlabeled opposed longitudinal sides with a pair of opposed lateral apertures 70 extending orthogonally from the longitudinal sides :and into the planar member. A pair of securing apertures 72 are formed into the planar member 64 are oriented so as to extend orthogonally from the lateral apertures 70 and parallel to the longitudinal sides of the planar member. By this structure, the towing rods 36 and 40 can be decoupled from the respective lateral extension members 32, 34 and positioned within an individual one of the securing apertures 72 to retain the towing reels in the stored position illustrated in FIG. 5. To preclude unintentional removal of the towing rods 36 and 40 from the securing apertures 72, the planar member is shaped so as to define a pair of opposed securing projections 74 extending into each of the securing apertures at a juncture of the securing aperture and the respective lateral aperture 70.

In use, the mounting means 12 of the wheelchair tether 10 can be easily coupled to a wheelchair, gurney, stretcher, or other movable conveyance. A towable medical support, such as the IV pole 18 illustrated herein, can be coupled to the wheelchair mounting means 12 by the support mounting means 16 as described above. The present invention 10 can then be utilized to tow the medical support structure 18 relative to the wheelchair or other movable conveyance. Such convenience provides an individual the freedom to operate the wheelchair with both hands, while simultaneously towing necessary medical support structure.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are :intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A tether for coupling a medical support structure to a movable conveyance, comprising:

a mounting means adapted to be secured to said movable conveyance;

and, a support mounting means pivotally coupled to said mounting means for towing said medical support structure relative to said movable conveyance, wherein said mounting means comprises at least one rear extension member securable to said movable conveyance; and at least one lateral extension member secured to said at least one rear extension member and projecting substantially orthogonally therefrom;

wherein said support mounting means comprises at least one towing rod pivotally and removably coupled to a distal end of said at least one lateral extension member; and at least one post coupler pivotally mounted to an end of said at least one towing rod, said at least one post coupler being securable about a post of said medical support structure, and wherein said at least one post coupler comprises a first upper semi-cylindrical member positionable partially about said post of said medical support structure; a second upper semi-cylindrical member removably coupled to said first upper semi-cylindrical member to secure and frictionally engage said upper post coupler about said post; a pivot arm pivotally mounted to said first upper semi-cylindrical member, said pivot arm extending from said first upper semi-cylindrical member to pivotally couple with said end of said at least one towing rod.

2. The tether of claim 1, wherein said mounting means further comprises at least one other extension member securable to said supporting leg of said movable conveyance; at least one other lateral extension member secured to said at least one other extension member and projecting substantially orthogonally therefrom; and a center support member extending between distal ends of said rear extension members to support the rear extension members in a spaced relationship relative to one another; at least one other lateral extension member secured to said at least one other extension member and projecting substantially orthogonally therefrom relative to said at least one other extension member.

3. The tether of claim 2, wherein said support mounting means further comprises at least one other towing rod pivotally and removably coupled to a distal end of said at least one other lateral extension member; and at least one other post coupler pivotally mounted to an end of said at least one other towing red, said at least one other post coupler being securable about a post of said medical support structure.

4. The tether of claim 3, wherein said at least one other post coupler comprises a first semi-cylindrical member positionable partially about said post of said medical support structure; a second semi-cylindrical member removably coupled to said first semi-cylindrical member to secure and frictionally engage said at least one other post coupler about said post; a pivot arm pivotally mounted to said first semi-cylindrical member, said pivot arm extending from said first semi-cylindrical member to pivotally couple with said end of said at least one other towing rod.

5. The tether of claim 4, and further comprising a storing tab means for retaining at least one of said towing rods relative to said medical support structure when disconnected from said mounting means.

6. The tether of claim 5, wherein said storing tab comprises a substantially planar member having a circular aperture extending therethrough for receiving said post of said medical support structure therethrough; said planar member being shaped so as to define a plurality of radial projections extending radially inward from an interior of said aperture to resiliently engage an exterior surface of said post; said planar member further being shaped so as to define opposed longitudinal sides, at least one lateral aperture extending orthogonally from at least one of said longitudinal sides and into said planar member, and at least one securing aperture formed into said planar member and oriented so as to extend orthogonally from said at least one lateral aperture and parallel to said longitudinal sides of said planar member.

7. The tether of claim 6, wherein said planar member of said storing tab means is further shaped so as to define a pair of opposed lateral apertures extending into said planar member from said opposed longitudinal sides thereof, respectively, wherein a corresponding towing rod is adapted to be received within each of said lateral apertures, respectively.

* * * * *